May 20, 1958 J. F. WHITMORE 2,835,078
PROTECTIVE COVER FOR AGRICULTURAL CROPS
Filed June 6, 1955
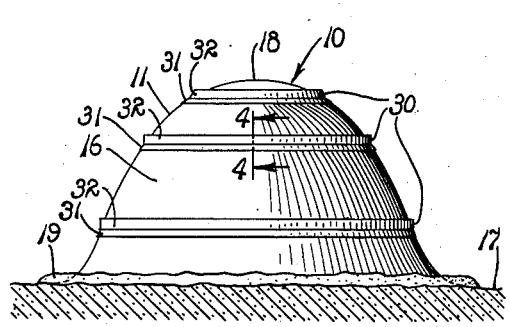
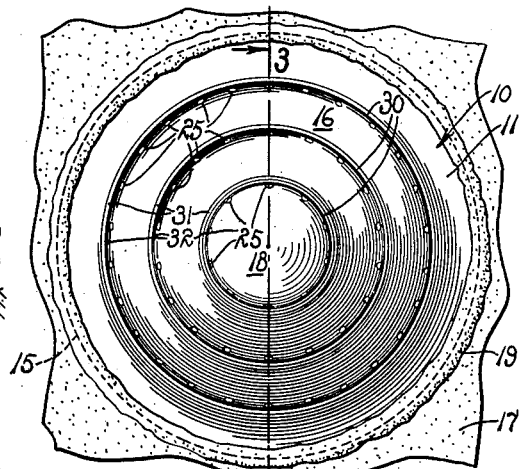
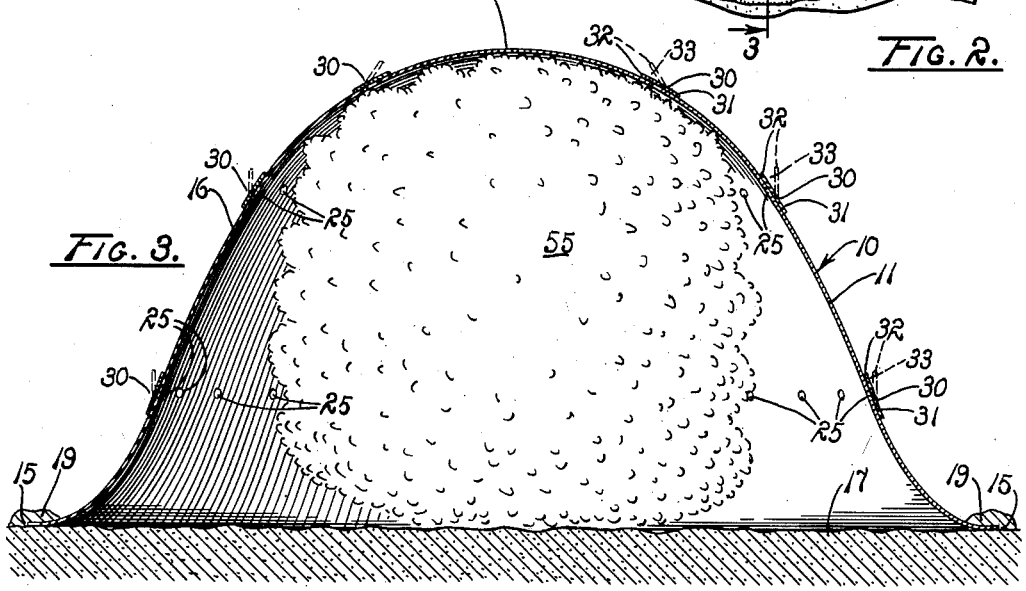
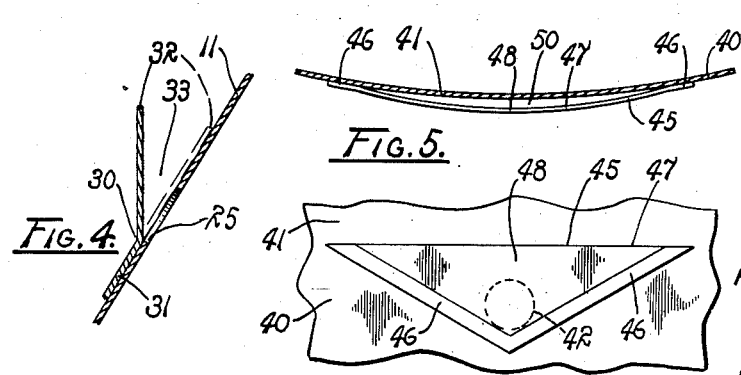
JOHN F. WHITMORE
INVENTOR
HUEBNER, BEEHLER,
WORREL & HERZIG
ATTORNEYS

United States Patent Office 2,835,078
Patented May 20, 1958

2,835,078

PROTECTIVE COVER FOR AGRICULTURAL CROPS

John F. Whitmore, Visalia, Calif.

Application June 6, 1955, Serial No. 513,283

13 Claims. (Cl. 47—21)

The present invention relates to protective covers and more particularly to a protective cover for the protection of crops and the like against freezing temperatures.

Most sub-tropical fruit trees, such as orange, lemon, grapefruit, avocado, and the like, require protection against frost when grown in certain climates occasionally subject to below freezing temperatures.

Conventionally, it is most common to employ orchard heaters to maintain such trees above their minimum temperatures of tolerance in order to prevent damage due to frost. Obviously, this is an expensive, time consuming and laborious task which, for effective action, depends on timely use by attendants. Although such heaters are known in both portable and stationary form, their efficiency of orchard heating, requisite care and attention, rate of fuel consumption, and facility of employment under emergency conditions are not of optimum satisfaction.

While hot caps have been widely adapted and highly satisfactory for the protection of seedlings and small plants, prior tree covers have not been generally accepted even though effort extending back over many years, as evidenced by numerous patents granted on tree covers, has been directed to the provision of covers or hot caps suited to the protection of trees and fruit grown thereon. Generally speaking, such covers are cumbersome to handle and have required frequent installation and removal. While several thereof have been effective in shielding trees protected thereby against excessively low temperatures, they have at the same time shielded the trees and the ground thereabout from all rainfall and/or sprinkler irrigation. As a result, it has been necessary to install conventional tree covers whenever there has been a threat of harmful temperature decrease and promptly to remove the covers in anticipation of each rain or sprinkler irrigation. The repetitious labor involved in emplacing and removing the covers and the inaccuracy of anticipating weather conditions has heretofore virtually precluded the acceptance of tree covers for any but extremely limited use, as for example, for the protection of one or a very few trees in a family orchard.

Although the foregoing problems are excellently illustrated in the growth of sub-tropical trees, they are not so limited in occurrence. Thus, the foregoing is not intended to restrict the solutions which the present invention affords to application with sub-tropical trees alone nor even to other types of trees, inasmuch as many other forms of vegetable or plant growth, generally referred to herein as "crops," may be similarly affected and cared for.

Accordingly, an object of this invention is to provide an improved protective cover for crops and the like.

Another object is to minimize damage to plant growth as a result of freezing temperatures.

Another object is to provide a protective cover for crops which permits heat, light and moisture to reach the plants.

Another object is to provide a protective cover of the nature described which is adapted for continuous use over substantial periods of time.

Another object is to provide a protective cover for plants which permits conversion of light energy to heat energy thereby to maintain the plant protected at a sufficiently warm temperature to stimulate growth during the daytime and afford protection at night.

Another object is to provide a protective cover for crops and the like which is automatically opened during rainfall to admit rain to the protected crops and during the absence of rainfall effectively shields the crops from undue temperature decreases.

Other objects are to provide a protective cover for crops which is simple and economical to manufacture and employ, durable in construction, easy to erect and remove, light in weight, adapted to a variety of construction sizes, and highly effective for its intended purposes.

These and other objects will become more fully apparent upon reference to the following description.

In the drawing:

Fig. 1 is a side elevation of a protective cover embodying the principles of this invention in erected position over a tree to be protected, not shown.

Fig. 2 is a top plan view of the cover shown in Fig. 1.

Fig. 3 is a somewhat enlarged vertical section taken along a vertical plane indicated by line 3—3 of Fig. 2 and showing a tree within the cover of Figs. 1 and 2.

Fig. 4 is a somewhat enlarged fragmentary vertical section taken on line 4—4 of Fig. 1.

Fig. 5 is a fragmentary horizontal section of a protective cover showing a modified form of the flap from that of Figs. 1–4.

Fig. 6 is a fragmentary side view of a cover showing the flap of Fig. 5 in side elevation.

Referring more particularly to the drawing:

A protective cover for perishable crops is generally indicated by the numeral 10 in Figs. 1, 2 and 3. The cover comprises a canopy, tent, envelope or housing 11 of flexible, light transmissible or transparent, moisture-proof, preferably disposable material, such as plastic, wax paper, suitable fabric or the like.

The canopy 11 provides a lower substantially circular circumscribing peripheral edge 15 and a wall portion 16 having a dome or inverted bowl-shape when erected. The canopy is adapted to be erected with the central portion in upwardly disposed position and with the peripheral edge in contact with the ground 17. In such a position, the central wall of the canopy provides a summit portion 18. Also, the canopy wall is downwardly and outwardly sloped from the summit portion along a gentle or smooth curve and is outwardly flared as it approaches the lower edge. When positioned in this manner, the canopy is substantially symmetrical about a central vertical axis coincident with the axis of the circular edge thereof. However, it should not be inferred that the canopy is necessarily of sufficient strength to maintain the form shown and described. It is preferably quite light weight and entirely incapable of supporting its weight. In fact, it should be so flexible as to be readily collapsed for compact storage and transportation. When sustained by a tree or other crop, it readily assumes the shape shown. A mound or ridge of dirt 19 is placed around the lower edge of the canopy in circumscribing overlapping relation thereto. Although such a mound of dirt is preferred, any other suitable means may be employed for maintaining the lower edge of the canopy against the ground.

The wall portion 16 of the canopy 11 is provided with a plurality of concentric vertically spaced rows of drainage openings or holes 25, as best seen in Figs. 2 and 3. The rows of drainage openings are preferably substantially concentric to the vertical axis of the canopy when the latter is erected and are also in circumscribing relation to the canopy. The spacing between the rows is such that a vertical projection of each row of openings on a horizontal plane, represented by the ground 17 beneath the canopy, results in a plurality of concentric circles of substantially uniformly progressively increased diameter, as best seen in Fig. 2. For a reason soon to be apparent, the spacing between adjacent concentric circles as projected on the ground is substantially the same as the spacing between adjacent openings in each of the rows of openings, which also is substantially uniform. Thus the spacing of the rows is greater near the lower edge of the canopy than near the top thereof.

The cover 10 also includes a plurality of substantially circular flaps 30, preferably of the same material as the canopy 11, having lower edge portions 31 individually bonded or secured in circumscribing relation to the canopy 11 beneath the rows of drainage openings 25. Each flap has an upper portion 32 adapted normally to lie against the canopy in closing relation to its respectively adjacent row of openings and to be moved outwardly from the canopy to form an annular trough or pocket, represented at 33, adjacent to its respective row of openings.

Second form

A second form of a portion of the present invention is shown in Figs. 5 and 6. A canopy 40 is fragmentarily shown therein and is constructed in a manner identical to that of canopy 11. Thus canopy 40 provides a central portion 41 having one or more holes, as 42, therein. It is to be understood that the holes 42 may be arranged in concentric circular, vertically spaced rows as in the canopy 11, or if desired, may be located in any other pattern in the canopy.

A modified form of flap 45 of substantially triangular form is provided and includes a pair of side edge portions 46 meeting in an apex, a base edge portion 47 opposite the apex, and a central portion 48. As is believed understood, the flap 45 may be of the same material as that described above in relation to the canopy 11. A plurality of such flaps 45 are provided to correspond to the number of drainage openings 42.

Each flap 45 is attached to the canopy 40 in substantially inverted position with the side edge portions 46 bonded or otherwise secured to the canopy so that the central portion 48 thereof is opposite its respective drainage opening 42 and such opening is approximately adjacent to the apex of the flap. The base edge portion 45 of each flap lies above its respective opening and is not attached to the canopy. It is to be noted that the central portion of each flap is slightly outwardly bulged from the canopy so that the flap does not fit taut or flush against the canopy. The central portion of the flap thus is adapted for movement between a first position in closed relation to the opening and a second position outwardly spaced from the opening to provide a trough or pocket, represented at 50, for collection of rain water and drainage through its respective opening.

Operation

The operation of this invention is believed to be readily apparent and is briefly summarized at this point.

The protective cover 10 of the present invention is shown in use on a tree 55 growing in the ground 17. The cover 10 may be erected or positioned on the tree in several ways. For example, the canopy 11 may be manually thrown over the tree, ladders may be employed gently and manually to lower the canopy over the tree, or a crane may be utilized as a mechanical aid to emplacement. In any event, the dome-shaped central portion 16 of the canopy is adapted to rest in enveloping relation around the tree with the lower edge 15 in contact with the ground 17. The canopy is preferably adjusted so that the vertical axis of the tree coincides substantially with the vertical axis of the cover, as above described. A mound of dirt 19 is then placed around the lower edge of the canopy also in the manner previously described.

The protective cover 10 of the present invention is preferably used continuously throughout the winter months when below freezing temperatures are a common occurrence during the night. In actual use, the tree 55 protected by the cover receives the beneficial effects of sunshine through the light transmissible material of the canopy during the day in substantially the same manner as if such cover were not positioned thereover. In addition, sunlight hitting the ground 17 in an area within the canopy is absorbed and converted into heat energy.

During the night, this heat energy warms the environment of the tree inasmuch as it is confined or captured within the canopy 11. In this regard it is to be noted that the annular mound of dirt 19 maintains the cover in substantially air-tight relation against the ground and further, that the annular flaps 30, or the flaps 45, lie in closing relation against the openings 25, or 42, to retain heat entrapped within the canopy. This action is highly effective during nights when the temperatures are at or below freezing inasmuch as heat is stored in the soil during the day and radiated at night beneath the canopy.

During rainy weather, rain water flows down the sloping central portion 16 of the canopy 11 and is collected in the annular flaps 30, or the flaps 45, urging these flaps into their open or outer positions. As described the flaps form troughs 33, or 50, in which rain water is collected and directed for drainage through the openings 25, or 42. The drainage openings are positioned in the manner above described, in particular in relation to Figs. 1–4, so as to insure uniform distribution of rain water on the ground 17 within the area covered by the canopy 11. It is also to be understood that the uncovering of the drainage openings by the flaps does not objectionably disturb the heat retentive characteristics of the canopy inasmuch as heat retention is seldom needed during rainy weather and the heat loss through the openings is of small extent.

Following periods of rain, the flaps 30 and 45 normally collapse inwardly against the canopy and close the openings, thus assuring heat retention efficiency when needed.

From the foregoing it will be evident that a highly effective and efficient protective cover for trees and other crops has been provided. The cover is adapted for continuous use over substantial periods of time during which time sunlight and rain can reach the protected crop while the harmful effects of excessive temperature decrease are shielded therefrom. The cover is light, yet durable in form, easily handled and does not unnecessarily bear, or weigh, down the crop being protected. In practice it has been found to be very successful for its intended purposes.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A cover for perishable crops comprising a canopy adapted to envelop such a crop so as to be downwardly sloped from the top of the crop having a drainage opening in the downwardly sloped portion thereof, and closure means connected to the canopy associated with the opening adapted normally to cover the opening and automatically operable by rain water descending on the canopy to uncover the opening and direct rain water therethrough.

2. A heat retentive, rain water admitting cover for perishable crops comprising a canopy of light transmissible sheet material adapted to rest on such crops in covering relation thereto so as to have a downwardly sloped portion, the canopy having a drainage opening therein in the downwardly sloped portion, and means connected to the canopy adjacent to the opening having a rest position against the canopy covering the opening and automatically movable outwardly from the canopy by rain water descending the canopy to uncover the opening and to direct the rain water therethrough.

3. A heat retentive cover for perishable crops comprising a canopy having a circumscribing peripheral edge adapted to rest on the ground and a central portion adapted to rest on crops to be protected and downwardly sloped to the peripheral edge, said canopy having a drainage opening in the downwardly sloped part of the central portion, and means mounted externally on the canopy adjacent to the drainage opening having a normally closed position in covering relation to the opening to retain heat entrapped within the canopy and an open position extended outwardly from the canopy to which position it is opened by rain descending on the canopy and in which position it collects and directs rain inwardly through the drainage opening.

4. A heat retentive cover for perishable plants comprising a housing having a predetermined lower peripheral edge adapted to rest on the ground and a central upwardly sloped portion adapted to envelop therewithin a plant to be protected, the housing having a drainage opening in the upwardly sloped portion thereof, and a member having a lower edge connected externally to the housing beneath the drainage opening therein normally rested against the housing in covering relation to the drainage opening to retain heat within the housing and being moved outwardly of the housing away from the opening incident to passage of rain water thereunder for collection of such rainwater and direction through the opening.

5. A heat retentive cover of flexible light transparent sheet material for perishable plants and the like comprising a canopy having a lower circumscribing peripheral edge, means securing the edge of the canopy against the ground in substantially air-tight relation circumferentially of a plant to be protected, the canopy further having an upwardly sloped dome-shaped central portion adapted to rest on the plant being protected in enveloping relation thereto, said canopy having a row of drainage openings therein in circumscribing relation to the dome-shaped portion, and a substantially circular flap having a lower edge secured externally to the canopy below the row of drainage openings having a normally closed position in flat engagement against the canopy in closing relation to the openings to retain heat entrapped within the canopy and an open position extended outwardly from the canopy, being urged into such position by rain water descending on the sloped central portion of the canopy, for the collection and drainage of such water inwardly through the drainage openings.

6. A heat retentive cover of flexible light transparent sheet material for perishable plants and the like comprising a canopy having a lower circumscribing peripheral edge, the canopy further having an upwardly sloped dome-shaped central portion adapted to rest on the plant being protected in enveloping relation thereto, said canopy having a drainage opening in the dome-shaped portion; and a substantially triangular flap having a pair of side edges secured externally to the canopy below the drainage opening and upwardly divergently extended on opposite sides thereof, an upper free edge positioned above the drainage opening, and a central portion disposed opposite the opening, said flap having a normally closed position in engagement against the canopy in closing relation to the opening to retain heat entrapped within the canopy and an open position extended outwardly from the canopy, being urged into such position by rain water descending on the sloped central portion of the canopy, for the collection and drainage of such water inwardly through the drainage opening.

7. A heat retentive cover for protecting trees against damaging frost and the like while permitting beneficial sunlight and rain to reach such trees comprising a canopy of flexible light transparent material adapted to fit in upright enveloping relation over a tree having a substantially dome-shaped upper portion in covering relation to the tree, a downwardly and outwardly flared substantially circular lower edge adapted to be maintained in peripheral contact against the ground around the tree to confine heat radiated from an area of the ground defined by said lower edge within the canopy, a plurality of concentric vertically spaced rows of drainage openings in circumscribing relation to the cover with the rows being spaced progressively closer to each other upwardly of the cover, and a plurality of substantially circular flaps of flexible light transparent fluid impervious material having lower edges individually secured in fluid tight circumscribing relation individually subjacent to the rows of drainage openings and having upper free edges, the flaps being adapted normally to lie in closing relation to their respective rows of drainage openings and being adapted to move outwardly to constitute troughs for rain collection and drainage through the drainage openings incident to the descent of rain on the cover.

8. A disposable heat retentive cover for protecting perishable trees against frost and the like comprising a canopy of flexible light transmissible substantially moisture-proof material having a lower circumscribing peripheral edge adapted to rest on the ground, means positioned in circumscribing relation on the lower edge for maintaining such edge in close substantially air tight contact with the ground, the canopy having a dome-shaped central portion upwardly sloped from the lower edge thereof adapted to rest on the tree being protected in covering relation thereto, said canopy having a plurality of concentric vertically spaced rows of drainage openings in circumscribing relation to the central portion with the rows being spaced progressively closer to each other upwardly of the cover so that the vertical projections of the rows on a horizontal plane substantially coincident with the ground therebeneath define a plurality of concentric circles substantially equally spaced apart with the distance between adjacent circles being substantially the same as the distance between adjacent openings in each row of openings, and a plurality of substantially circular flaps of flexible light transparent substantially moisture-proof material having lower edges individually secured in fluid-tight circumscribing relation below the rows of drainage openings, the flaps being adapted normally to rest flatly against the canopy in closing relation to their respective rows of openings and being adapted automatically to move into outwardly upwardly extended positions by engagement thereagainst of water descending the canopy thereby to constitute troughs for collecting the water and for directing such water through their respective openings.

9. A heat retentive cover for perishable plants comprising a canopy having a lower circumscribing peripheral edge, an upwardly sloped dome-shaped central portion adapted to rest on the plant being protected in enveloping relation thereto, and a drainage opening in the dome-shaped portion; and a flap having a lower edge secured externally to the canopy below the drainage opening, a central portion opposite to the opening, and an upper free edge, said flap having a normally closed position in engagement against the canopy in closing relation to the drainage opening to retain heat entrapped within the canopy and an open position extended outwardly from the canopy, being urged into such outwardly extended open position by rain water descending the sloped central portion of the canopy thereby to collect such water for passage through the drainage opening.

10. A cover for protecting crops against damaging frost while permitting rain water to moisten the ground around such a crop being protected comprising a canopy of substantially water-proof material adapted to fit in upright enveloping relation over a crop being protected having a substantially dome-shaped upper portion in covering relation to the crop, a lower edge adapted to be maintained in peripheral contact against the ground around the crop, a plurality of substantially concentric vertically spaced rows of drainage openings in circumscribing relation to the dome-shaped portion of the canopy with the rows being spaced progressively closer to each other upwardly of the canopy so that vertical projections of the rows on a horizontal plane substantially coincident with the ground beneath define a plurality of substantially concentric circles substantially equally spaced apart with the distance between adjacent circles being substantially the same as the distance between adjacent openings in each row of openings whereby rain water passing through the drainage openings is substantially uniformly distributed over the ground around the crop being protected, and projecting means subjacent to the openings for collecting rain water and directing it through the openings 11. A heat retentive cover for perishable plants and the like comprising a canopy of waterproof material adapted to fit in upright enveloping relation over a plant having a substantially dome-shaped upper portion in covering relation to the plant, a lower edge adapted to be maintained in peripheral contact against the ground around the plant to confine heat within the canopy, a plurality of concentric vertically spaced rows of drainage openings in circumscribing relation to the cover and to the plant being covered with the rows being spaced progressively closer to each other upwardly of the cover, and a plurality of flaps of substantially waterproof material having lower edges individually secured in fluid-tight relation subjacent to the drainage openings and having upper free edges, the flaps being adapted normally to lie in closing relation to their respective drainage openings and being adapted to move outwardly to constitute troughs for rain water collection and drainage through the openings incident to descent of rain water on the canopy.

12. A disposable, light weight, heat retentive cover for protecting perishable crops against frost and the like comprising a canopy of substantially moisture proof material having a lower peripheral edge adapted to rest on the ground around the crop to be protected; means positioned in circumscribing relation on the lower edge for maintaining such edge in close substantially air-tight contact with the ground throughout substantially the entire periphery thereof, the canopy having a dome-shaped central portion upwardly sloped from the lower edge thereof adapted to envelope the crop being protected and a plurality of substantially concentric vertically spaced rows of drainage openings in circumscribing relation to the central portion and the crop being protected with the rows being spaced progressively closer to each other upwardly of the canopy so that vertical projections of the rows on a horizontal plane substantially coincident with the ground therebeneath define a plurality of substantially concentric circles substantially equally spaced apart with the distance between adjacent circles being substantially the same as the distance between adjacent openings in each row of openings; and a plurality of flaps of substantially moisture-proof material having lower edges individually secured in fluid-tight relation below the drainage openings and upper free edges; the flaps being adapted to rest flatly against the canopy in closing relation to their respective drainage openings and being adapted automatically to move into outwardly spaced relation to the canopy incident to the descent of rain water downwardly along the canopy thereby to constitute troughs for collecting rain water and for directing such water through their respective openings.

13. A cover for perishable crops comprising a canopy having a circumscribing peripheral edge adapted to rest on the ground around the crop to be protected and a central upwardly sloped portion adapted to envelope such plant to be protected, the canopy having a drainage opening in the upwardly sloped portion thereof adapted to admit rain water descending the canopy for moistening the ground around the crop being protected, and there being an obstruction on the canopy immediately below and projected outwardly of the opening for collecting rain water descending the canopy and for directing it through the opening.

References Cited in the file of this patent

UNITED STATES PATENTS

| | | |
|---|---|---|
| 1,178,803 | Hendricks | Apr. 11, 1916 |
| 1,910,828 | Flanders | May 23, 1933 |
| 2,300,776 | Collins | Nov. 2, 1942 |